United States Patent Office 3,406,722
Patented Oct. 22, 1968

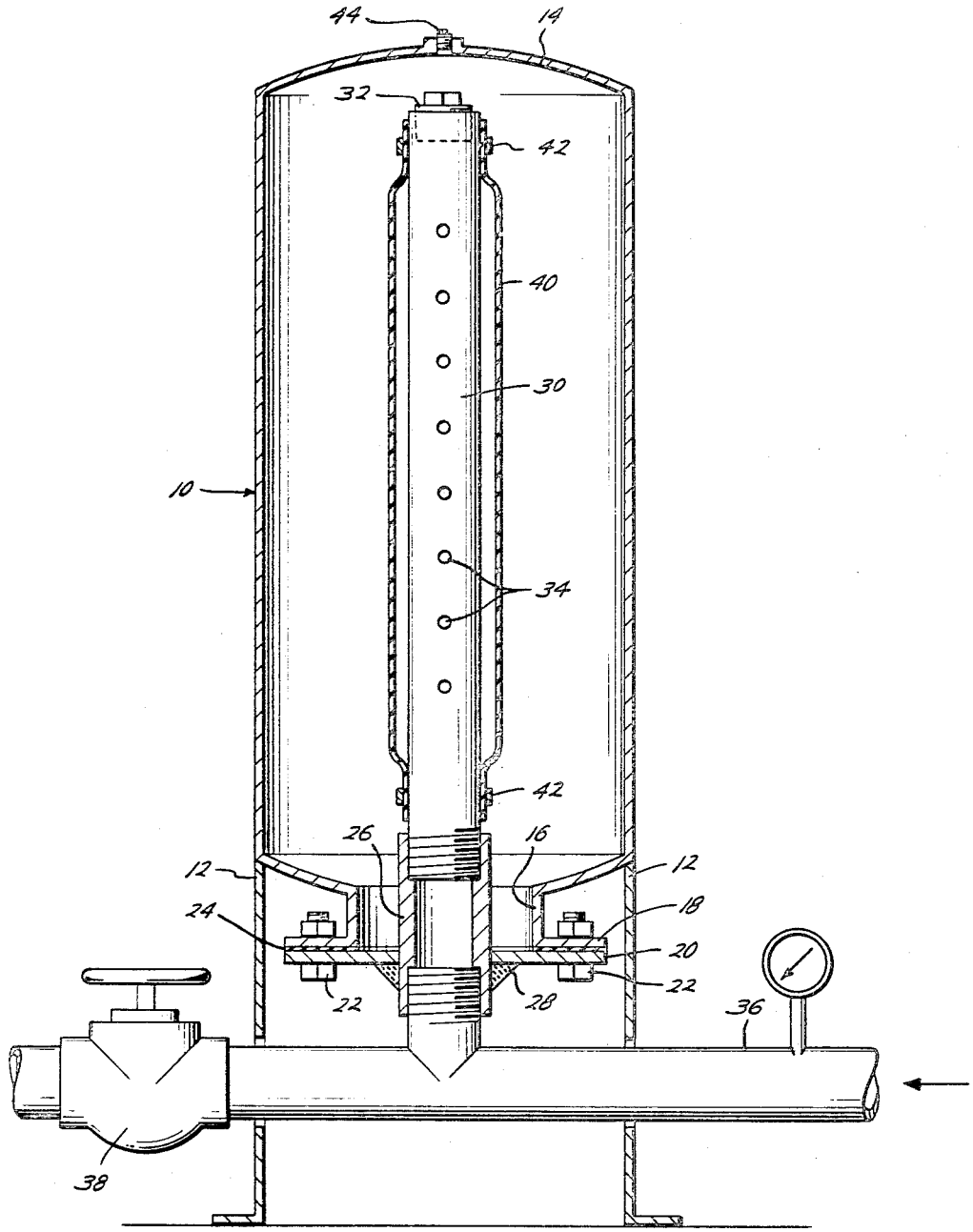

3,406,722
PRESSURE TANK EQUIPMENT FOR WATER
SUPPLY SYSTEMS
Arthur P. Ruth, 5025 Jensen Drive,
Houston, Tex. 77026
Filed Oct. 18, 1965, Ser. No. 497,184
1 Claim. (Cl. 138—30)

ABSTRACT OF THE DISCLOSURE

Pressure tank equipment for water supply systems embodying a perforated pipe provided with a surrounding expansible, elastic sleeve into and out of which water may flow into and out of the tank to maintain air under pressure externally of the sleeve in the tank out of contact with the water. Means is provided for inserting the pipe and sleeve as a unit into the tank and removing the same therefrom.

---

This invention relates to water supply systems and more particularly to pressure tank equipment for use in such a system.

In water supply systems, and especially such systems in which water is pumped from a well into a pressure tank from which the water is discharged under pressure, it has been customary to pressurize the tank with air with which the water is in contact whereby a sufficient pressure is maintained to discharge the water at a desired pressure at various locations throughout the system.

Water supply systems of this type are usually provided with electric pumps which are actuated automatically when the pressure in the supply tank falls to a predetermined lower limit to replenish the water in the tank, thus also restoring the pressure therein to a predetermined upper limit.

As heretofore commonly constructed, water supply systems of this kind are subject to the disadvantage that the air in contact with the tank in the supply tank is gradually dissolved in the water, so that after a time the air supply becomes exhausted and the tank is then substantially completely filled with water. Under these conditions the pressure in the tank is immediately reduced to cause operation of the pump whenever withdrawal of water from the tank occurs, so that the advantages of a pressure storage system are lost, making it necessary to drain the tank and repressurize the same with air to restore the system to proper operation.

Moreover, the dissolving of the air in the water, results in the precipitation of dissolved minerals in the water and especially the oxidation and precipitation of dissolved iron, which may accumulate in the tank to an undesirable extent or be discharged with the water in the form of rust.

The present invention has for an important object the provision of pressure tank equipment for water supply systems wherein means is embodied for effectively maintaining the air in the tank out of contact with the water therein.

Another object of the invention is to provide pressure tank equipment for water supply systems in which air under pressure is used to discharge water from the tank and embodying means whereby the water may be substantially completely discharged from the tank without the escape of any of the air therefrom.

A further object of the invention is the provision of pressure tank equipment for water supply systems including a tank having a bottom end opening, a water inlet and discharge pipe extending into the tank through said opening and having longitudinally spaced openings therein and an expansible, elastic sleeve surrounding and secured at its opposite ends to the pipe in the tank and enclose the openings in the pipe whereby water entering the tank will be separated by the bag from air in the tank exteriorly of the bag.

The above and other obvious advantages of the invention may best be understood from the following detailed description constituting a specification of the same, when considered with the annexed drawings, wherein the single figure is a vertical, central, cross-sectional view of pressure tank equipment embodying the invention, showing the same connected into a water supply system.

Referring now to the drawings in greater detail the pressure tank equipment of the invention includes a pressure tank generally designated 10, adapted to be supported in an upright position, as by means of legs 12, 12 or other suitable means attached to the bottom of the tank.

The tank 10 may be of a usual configuration, such as cylindrical, having a closed upper end 14 and a bottom end neck portion 16 formed with an external, annular, end flange 18.

The tank is closed at its lower end by a closure plate 20 removably secured to the flange 18, as by means of bolts 22, suitable sealing means being provided between the flange and plate as indicated at 24, by which leakage from the tank is prevented.

The closure plate has a central opening through which a screw threaded fitting 26 is extended, which fitting is suitably secured to the plate as by means of welding indicated at 28.

To the inner end of the fitting 26 an elongated, internal upstanding pipe 30 is threadably connected at its lower end, which pipe is closed at its inner end, as by means of the screw plug 32. The pipe 30 is provided with a number of longitudinally spaced openings 34 mediate its ends.

The lower end of the fitting 26 is suitably connected into a water line 36 through which water may be pumped into the tank from a well or other water source, and which also leads from the tank to a location in the system to which water is to be supplied under pressure. The line 36 may be provided with a suitable valve 38 by which the discharge of water from the tank therethrough may be controlled.

Within the tank 10 of the perforated inlet pipe 30 is surrounded by a flexible, elastic, expansible receptacle in the form of a sleeve or bag 40 formed of suitable material, such as rubber, or the like, which is suitably secured at its ends to the pipe, as by means of bands 42, to form an enclosure whose interior is in communication with the interior of the inlet pipe 30 through the openings 34. The sleeve 40 has a portion between its ends which is located in surrounding, radially spaced relation to the pipe 30 when the sleeve is in its unexpanded or collapsed condition, so that the sleeve does not close the openings 34 against the outflow of water therethrough.

The upper end 14 of the tank may be provided with a suitable plug or valve 44 through which air under pressure may be introduced to pressurize the tank to any desired pressure.

In the use of the equipment water is pumped into the tank through the inlet pipe 30 to expand the bag 40 compressing the air in the tank externally of the bag until the pressure reaches the predetermined pressure at which the system is adjusted to discontinue the pumping of the water into the tank. With the tank thus charged with water under the desired pressure, water may be withdrawn from the system through the line 36 under the pressure of the air in the tank, the bag 40 being gradually contracted thereby until the pressure in the tank falls to a value at which the system is adjusted to again start the pumping of water into the tank to replenish the water in the bag and repressurize the air in the tank.

It will be apparent that the bag 40 will be at all times extended longitudinally of the pipe 30, so that substantially all of the water may be discharged from the bag into the line 36 without danger of the bag interfering with the outflow from the tank due to collapsing or sagging of the bag. The bag 40 also effectively separates the water from the air in the tank, thus preventing absorbtion of the air of the water and the accumulation of deposits in the tank due to the presence of dissolved minerals in the water. Due to the separation of the water and air in the tank the water is at all times maintained completely out of contact with the metal of the tank, thus preventing corrosion of the tank from corrosive substances in the water, thus greatly prolonging the life of the tank.

The plate 20, fitting 26, pipe 30 and bag 40 may be removed as a unit from the tank through the neck 18 by removing the bolts 22 and disconnecting the fitting from the line 36, for the purpose of replacing the bag or otherwise maintaining or repairing the unit.

It will thus be seen that the invention constructed as described above provides pressure tank equipment for use in water supply systems which is of simple design and rugged construction and by which depletion of air in the tank due to absorbtion of the same in the water which is supplied to and discharged from the tank is effectively prevented.

The invention is disclosed herein in connection with a particular embodiment of the same which is intended by way of illustration only, and it will be understood that such embodiment is capable of various modifications within the spirit of the invention and the scope of the appended claim.

Having thus clearly shown and described the invention, what is claimed as new and desired to secure by Letters Patent is 1. Pressure tank equipment for water supply systems comprising a tank having a bottom opening, an external neck portion formed on the tank surrounding said opening and having an external annular outer end flange, a cover plate detachably secured to the flange and closing the opening, a threaded fitting extending into the tank centrally through said plate, a pipe connected to the upper extremity of the threaded fitting and through which water may flow into and out of the tank and formed with longitudinally spaced openings mediate its ends inside of the tank, and a closed, expansible receptable surrounding the pipe in the tank enclosing the openings and secured to the pipe at locations longitudinally beyond the openings and whose interior is in communication with the interior of the pipe said pipe and plate being affixed together to allow the pipe and receptacle to be removed as a unit from the tank by detachment of the plate from said flange.

References Cited

UNITED STATES PATENTS

| | | | |
|---|---|---|---|
| 841,791 | 1/1907 | Lemp. | |
| 1,579,891 | 4/1926 | Sandoz | 138—30 |
| 2,630,834 | 3/1956 | Weber et al. | 138—30 |
| 2,761,472 | 9/1956 | Harbich et al. | 138—26 |
| 2,811,925 | 11/1957 | Crookston. | |
| 2,828,769 | 4/1958 | Cooper | 138—30 |
| 2,838,073 | 6/1958 | Di Mattia et al. | 138—30 |
| 2,947,326 | 8/1960 | Mercier | 138—30 |
| 3,065,766 | 11/1962 | Wenzl | 138—30 |
| 2,845,951 | 8/1958 | Hugley et al. | 138—30 |

HOUSTON S. BELL, JR., *Primary Examiner.*